Patented June 17, 1930

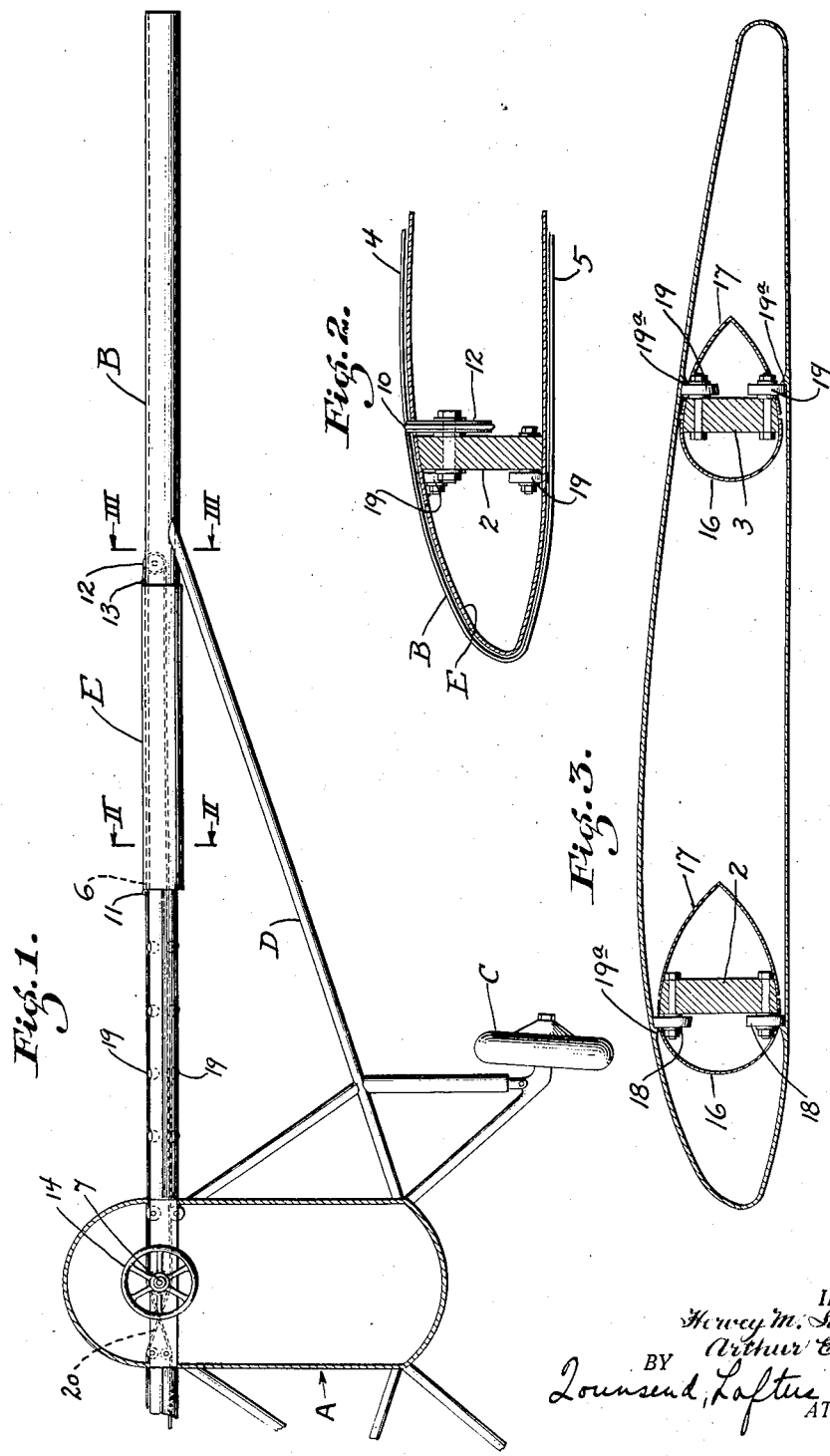

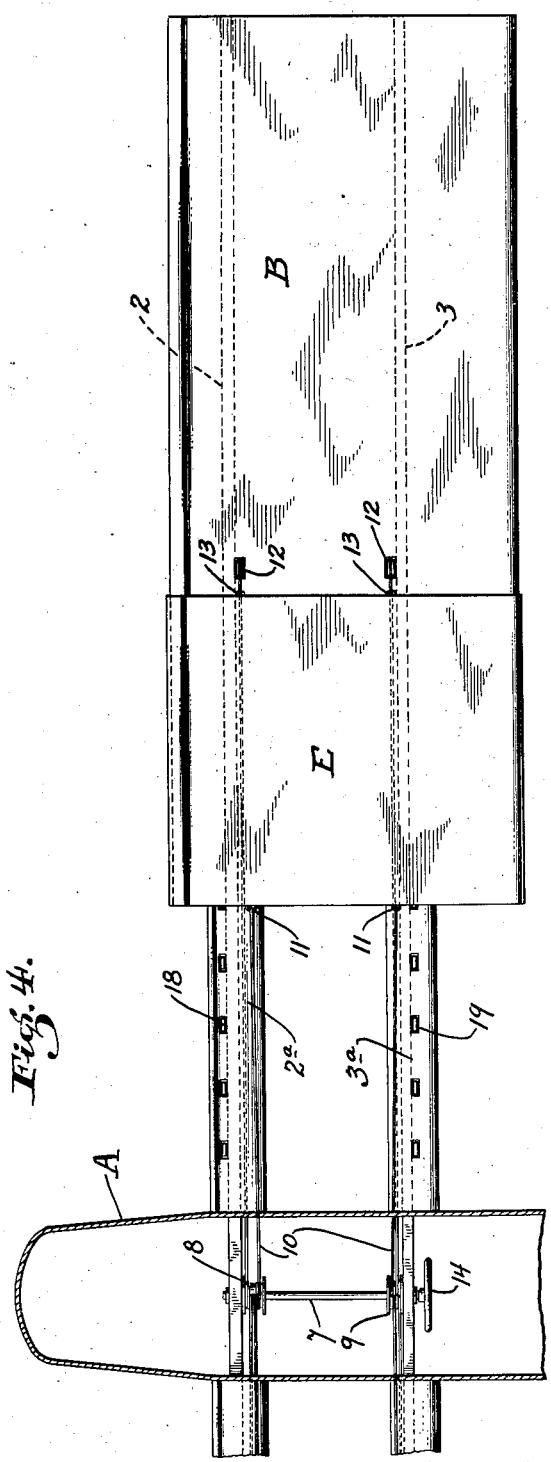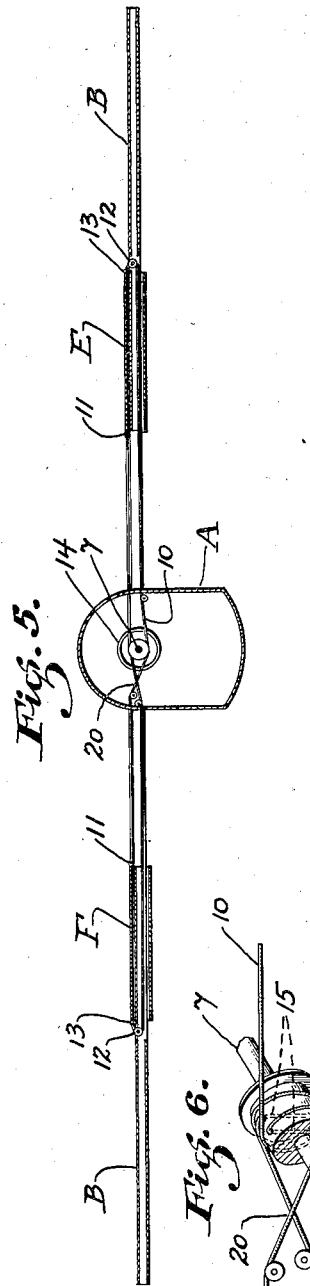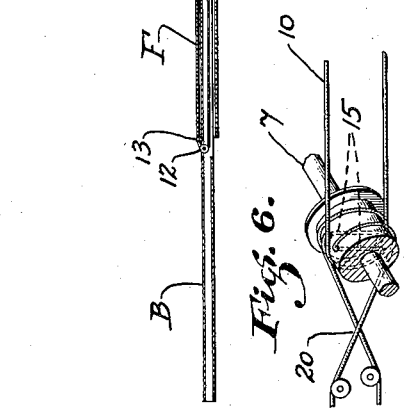

1,764,122

UNITED STATES PATENT OFFICE

HERVEY M. SALISBURY, OF WALNUT GROVE, AND ARTHUR E. MILLER, OF SACRAMENTO, CALIFORNIA

VARIABLE-AREA WING STRUCTURE FOR AIRPLANES

Application filed February 6, 1928. Serial No. 252,086.

This invention relates to airplanes and especially to the wings or planes thereof, which in this instance, are so constructed that the supporting surface may be increased or decreased to suit different conditions of flight.

It is well known that a large amount of exposed wing surface creates a considerable resistance and greatly retards flight at high speeds while, on the other hand, a large wing surface greatly increases the lifting power when taking off and when climbing, and it also makes it possible to land at lower speeds. It is, accordingly, desirable to increase the wing area when taking off, when climbing and when landing and conversely to decrease the wing area when traveling at high speeds. While the broad idea of increasing or decreasing the wing area is not new, it is obvious that certain methods and mechanisms will be more efficient than others. The present invention discloses a method of increasing or decreasing the wing area which is believed to be more efficient than methods heretofore employed, and it furthermore permits a simplified and substantial structure.

The object of the present invention is to generally improve and simplify the construction and operation of variable area wing structures for airplanes; to provide a wing section which is adapted to telescope with relation to a permanent or stationary wing section so as to increase or decrease the area presented; and further, to provide a simple, substantial structure and mechanism whereby the telescoping wings or wing sections may be actuated. One form which the invention may assume is shown by way of illustration in the accompanying drawings, in which:

Fig. 1 is a partial front view of a monoplane, said view being partially in section and being partially broken away, Fig. 2 is an enlarged cross section taken on line II—II, Fig. 1, said view being partially broken away, Fig. 3 is an enlarged cross-section taken on line III—III, Fig. 1, Fig. 4 is a plan view of Fig. 1, said view being partially in section, Fig. 5 is a diagrammatic view showing the method of transmitting movement to the movable wing sections, Fig. 6 is a perspective detailed view showing the method of securing the cables whereby the movable wing sections are actuated.

Referring to the drawings in detail and particularly Figs. 1 and 2, A indicates the fuselage or body portion of an airplane, B one of the wings, C the underslung running gear, and D the trusses whereby the wings are secured. Extending through each wing are two or more wing beams, such as indicated at 2 and 3. These beams are in the present instance provided with a permanent or stationary covering, such as indicated at 4 and 5, and the permanent exposed supporting area is accordingly employed. The permanent covering extends from the outer end of each wing to the point indicated at 6. The covering may be constructed of any suitable material, such as thin sheet metal, fabric or the like. The wing beams are left uncovered on opposite sides of the fuselage and the uncovered portions extend to the point 6. A pair of movable cover sections, such as indicated at E and F, are however employed. These cover sections may be constructed of any suitable material, for instance duralumin, or the like, and they are adapted to telescope over the inner ends of the permanent cover sections of the wings, as shown in Figs. 1, 2, 4 and 5. The movable cover sections assume the position shown in Figs. 1, 4 and 5 when the plane is in flight and a high speed is desired. They are, however, moved inwardly to cover the uncovered sections of the wing beams indicated at $2^a$ and $3^a$ when taking off, when climbing or when making a landing.

The mechanism employed for transmitting movement to the movable cover sections E and F is best disclosed in Figs. 1, 4, 5 and 6. It consists of a shaft 7 disposed within the fuselage. Mounted on the shaft are pulleys, such as indicated at 8 and 9, and secured thereto are cables 10. One end of each cable is secured to the inner end of each movable cover section, as indicated at 11, while the opposite end of each cable is passed over a pulley 12 and secured to the outer end of the movable cover sections, as indicated at 13. Hence, by rotating the shaft 7 and the pulleys 8 and 9 in one direction or another by a hand wheel 14 or the like, power is transmitted to slide or move the cover members E and F inwardly or outwardly on the wing beams and any position desired may be assumed.

One suitable method of securing the cables to the respective pulleys is shown in Fig. 6, i. e., the cables are not only wound around the exterior surface of the pulleys 8 and 9, but they are also passed transversely therethrough, as indicated by dotted lines at 15. This is desirable as it positively prevents slippage of the cables with relation to the pulleys. The permanently covered sections of the wing beams may have any cross section desired, but the portions of the wing beams indicated at $2^a$ and $3^a$ which are covered at times and uncovered at other times should preferably have a stream line cross section. This can be accomplished in a number of ways but a practical method is to attach a front and rear shell section, such as indicated at 16 and 17. These shell sections are attached to the upper and lower faces of the beams 2 and 3 and as such form an exterior stream line contour which reduces head resistance to a minimum. The shell sections 16 and 17 merely extend from the sides of the fuselage to the point 6, as the beams are permanently covered from the point 6 and out. In order to reduce resistance and friction to a minimum when movement is imparted to the cover sections E and F, anti-friction rollers such as shown at 18 and 19 are journaled on the respective wing beams. These rollers engage the inner surfaces of the movable cover sections and as such support the same so that they may have a free movement at all times. Small inwardly projecting flanges are also desirable, as indicated at 19, as they further guide the movable cover sections and secure them against lateral movement with relation to the wing beams.

In actual practice we have found that the lifting efficiency of the wings is the greatest near the outer ends and the least near the inner ends or the points adjacent the opposite sides of the fuselage. This is due to the fact that the air stream striking the inner ends of the wings is exceedingly disturbed and turbulent due to the rearward blast of the propeller and also to any actions sent up by the fuselage. In view of these conditions we have selected to employ a permanent cover for the outer ends of the wings and a removable cover for the inner ends, i. e., high efficiency in speed is gained during flight when the movable cover sections assume their outermost positions, as the head resistance is materially reduced by uncovering the inner ends of the wing beams as shown at $2^a$ and $3^a$. Head resistance is beneficial when making a landing and so is supporting area. The movable cover sections are, accordingly, drawn inwardly toward the fuselage when landing and the landing can accordingly be made at a comparatively low speed. The movable cover sections will similarly maintain the same position when taking off and when climbing as forward speed at that time is not so important. On the other hand, lifting capacity is exceedingly desirable and as added lifting capacity is obtained when the innermost position is assumed, it is obvious that ideal conditions are brought about. The cables 10, whereby the movable wing sections are actuated, are preferably run interior of the wing beams, as shown. The pulleys 12 are similarly mounted within the beams or wings and head resistance is thus further reduced. The entire assembly is certainly feasible from a structural point as standard construction is, practically speaking, unaltered. The entire mechanism is simple and so is the actuating mechanism. A single control shaft 7 is employed and by crossing the cables on one side, as indicated at 20, it is possible to move the wing sections E and F inwardly and outwardly in unison by the single control means, to-wit, the pivot 7 and the hand wheel 14.

While the invention has been disclosed in conjunction with a plane of the monoplane type, it is obvious that biplanes or multiplanes may be similarly equipped. It should further be understood that only one form of the invention is illustrated, as it is obvious that the cover members might be moved into the fuselage and that other modified forms of construction might be resorted to.

Having thus described our invention, what we claim and desire to secure by Letters Patent is:

In an airplane, a body portion, wing beams disposed on each side thereof, a permanent covering for the wing beams and forming a supporting surface, said covering extending from the outer ends of the beams to points adjacent the sides of the body but leaving the inner ends of the beams uncovered for a predetermined distance, and a pair of cover members surrounding the beams and slidably mounted thereon, said cover members being movable to and away from the body to cover or uncover the inner ends of the wing beams, and said cover members when moved outwardly assuming a position exterior of the permanent covering on the wing beams.

HERVEY M. SALISBURY.
ARTHUR E. MILLER.